US008601515B2

(12) United States Patent
Sparrell

(10) Patent No.: US 8,601,515 B2
(45) Date of Patent: Dec. 3, 2013

(54) ON SCREEN ALERT TO INDICATE STATUS OF REMOTE RECORDING

(75) Inventor: Carlton Sparrell, Marblehead, MA (US)

(73) Assignee: Motorola Mobility LLC, Libertyville, IL (US)

( * ) Notice: Subject to any disclaimer, the term of this patent is extended or adjusted under 35 U.S.C. 154(b) by 707 days.

(21) Appl. No.: 11/616,948

(22) Filed: Dec. 28, 2006

(65) Prior Publication Data

US 2008/0163330 A1 Jul. 3, 2008

(51) Int. Cl.
*G06F 13/00* (2006.01)

(52) U.S. Cl.
USPC ............................... 725/58; 725/25; 725/133

(58) Field of Classification Search
USPC .......................................................... 725/58
See application file for complete search history.

(56) References Cited

U.S. PATENT DOCUMENTS

| | | | |
|---|---|---|---|
| 5,521,630 A | 5/1996 | Chen et al. | |
| 5,544,327 A | 8/1996 | Dan et al. | |
| 5,692,214 A | 11/1997 | Levine | |
| 6,014,693 A | 1/2000 | Ito et al. | |
| 6,064,794 A | 5/2000 | McLaren et al. | |
| 6,065,050 A | 5/2000 | DeMoney | |
| 6,177,931 B1 | 1/2001 | Alexander et al. | |
| 6,445,738 B1 | 9/2002 | Zdepski | |
| 6,510,554 B1 | 1/2003 | Gordon et al. | |
| 6,983,312 B1 | 1/2006 | O'Neil | |
| 7,095,402 B2 | 8/2006 | Kunii et al. | |
| 7,159,232 B1 | 1/2007 | Blackketter et al. | |
| 7,457,520 B2 | 11/2008 | Rossetti et al. | |
| 7,493,024 B2 | 2/2009 | Maetz et al. | |
| 2001/0033343 A1 | 10/2001 | Yap et al. | |
| 2001/0037511 A1 | 11/2001 | Inagaki | |
| 2002/0019984 A1 | 2/2002 | Rakib | |
| 2002/0138851 A1* | 9/2002 | Lord et al. | 725/133 |
| 2002/0151271 A1 | 10/2002 | Tatsuji et al. | |

(Continued)

FOREIGN PATENT DOCUMENTS

| | | |
|---|---|---|
| EP | 1217769 A1 | 6/2002 |
| EP | 1387281 A1 | 2/2004 |

(Continued)

OTHER PUBLICATIONS

"ReplayTV 5500 User's Guide", 2003, Digital Networks North America, Inc.*

*Primary Examiner* — Nicholas Corbo

(57) ABSTRACT

An arrangement is provided in which a mobile media rendering device such as a video-enabled mobile phone utilizes a graphical user interface ("GUI") to inform its user as to whether a remote recorder, such as a digital video recorder ("DVR") disposed in a set top box ("STB"), is recording a media program, such as a television show or movie, that is being simulcast to both the mobile phone and the remote recorder. A service verifies that the mobile phone and STB are associated with a valid service subscription. If so verified, then the service sends a control signal over a network to the STB to activate the DVR to record the selected simulcast media program. Various icons on the GUI are provided to let the user know that the DVR is recording the selected simulcast media program to long term storage, for example, or to indicate that the DVR is recording the program to more temporary storage. Or, if there is an issue that prevents the DVR from recording the selected simulcast media program then that is brought to the user's attention using a different icon displayed on the GUI.

10 Claims, 8 Drawing Sheets

(56) References Cited

U.S. PATENT DOCUMENTS

| | | |
|---|---|---|
| 2002/0166122 A1 | 11/2002 | Kikinis et al. |
| 2002/0194608 A1 | 12/2002 | Goldhor |
| 2003/0193519 A1 | 10/2003 | Hayes et al. |
| 2004/0107447 A1 | 6/2004 | Katagishi et al. |
| 2004/0143845 A1 | 7/2004 | Lin et al. |
| 2004/0187164 A1 | 9/2004 | Kandasamy et al. |
| 2004/0221305 A1* | 11/2004 | Broussard et al. ............... 725/38 |
| 2005/0005300 A1 | 1/2005 | Putterman et al. |
| 2005/0028208 A1* | 2/2005 | Ellis et al. ....................... 725/58 |
| 2006/0117351 A1 | 6/2006 | Sanders et al. |
| 2007/0124779 A1 | 5/2007 | Casey et al. |
| 2008/0046954 A1* | 2/2008 | Bhogal et al. ................. 725/134 |

FOREIGN PATENT DOCUMENTS

| | | |
|---|---|---|
| JP | 11225294 A | 8/1999 |
| WO | 0165862 A2 | 9/2001 |
| WO | 0219249 A2 | 3/2002 |
| WO | 03025726 A1 | 3/2003 |
| WO | 2004088983 A2 | 10/2004 |
| WO | 2005088969 A1 | 9/2005 |

* cited by examiner

ON SCREEN ALERT TO INDICATE STATUS OF REMOTE RECORDING

COPYRIGHT AUTHORIZATION

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

BACKGROUND

Mobile and Quad-Play (Voice, Video, Data, and Wireless) operators are currently rolling out video services to portable presentation devices such as mobile phones and other portable devices that can render video and have networking capability. These new services enable consumers to watch media content on the go, such as watching a baseball game on the train during a commute home. In many cases this same content is available simultaneously in one or more alternative formats. For example, the consumer might be watching a game via a DVB-H (Digital Video Broadcast-Handheld) broadcast to a QCIF-compatible (Quarter Common Intermediate Format) mobile phone, while an ATSC (Advanced Television Systems Committee), cable, or satellite broadcast simultaneously delivers the game in high-definition television ("HDTV") format to the consumer's home. Such simultaneous delivery of media content (e.g., the same television program) in multiple formats over multiple delivery paths is called "simulcasting."

The availability of rich simulcasting services for media content in digital form is growing. Consumers are becoming more aware of mobile video and are demonstrating more willingness to pay for enhanced services. In addition, platforms such as mobile phones and their underlying networks have become more capable of streaming and rendering video with good picture quality. Although many existing quad-play platforms are providing a satisfactory level of quality of video services to portable devices, additional features and services are desirable.

DETAILED DESCRIPTION

An arrangement is provided in which a mobile media rendering device such as a video-enabled mobile phone utilizes a graphical user interface ("GUI") to inform its user as to whether a remote recorder is recording a media program such as a television show or movie that is being simulcast to both the mobile phone and the remote recorder.

In one illustrative example, the video-enabled mobile phone works through a service to communicate with a remote digital video recorder ("DVR") that is incorporated in a set top box ("STB") that is coupled to a cable or satellite broadband multimedia delivery system. The service receives a signal from the mobile phone that indicates which simulcast media program has been selected by the user for watching.

The service verifies that the mobile phone and STB are associated with a valid service subscription. If so verified, then the service sends a control signal over a network to the STB to activate the DVR to record the selected simulcast media program. In that way, the user can watch the selected simulcast media program such as a ball game on the mobile phone's display screen (e.g., while on the train) while a full resolution version of the same media program, for example one in High-Definition ("HD"), is being recorded (e.g., at home) for later viewing.

Various icons on the GUI are provided to let the user know that the DVR is recording the selected simulcast media program to long term storage, for example, or to indicate that the DVR is recording the program to more temporary storage. Or, if there is an issue that prevents the DVR from recording the selected simulcast media program then that is brought to the user's attention using a different icon displayed on the GUI.

By arranging the remote recording as a transparent service that runs non-intrusively in the background, the user may consume media content without missing any part of the program when moving from one location to another and changing from the mobile device to a regular television. For example, the remote recording is automatically initiated from time to time as the user selects new media content on the mobile phone (i.e., switches "channels"). Thus, if the user begins with a movie and then selects a ball game to watch on the user's mobile phone, the movie is first recorded and then the game is recorded by the DVR at the user's home. In addition, the user can select a "pause" control on the mobile phone (or simply fold it up and place it in a pocket) to stop watching the ball game after reaching the train station. The user can then resume watching the game from the DVR at the point where it was paused on the user's television in HD in the living room at home. The present arrangement thus advantageously provides an additional desirable feature set to complement the mobile media content services that are presently receivable by portable media rendering devices.

Figure 1:
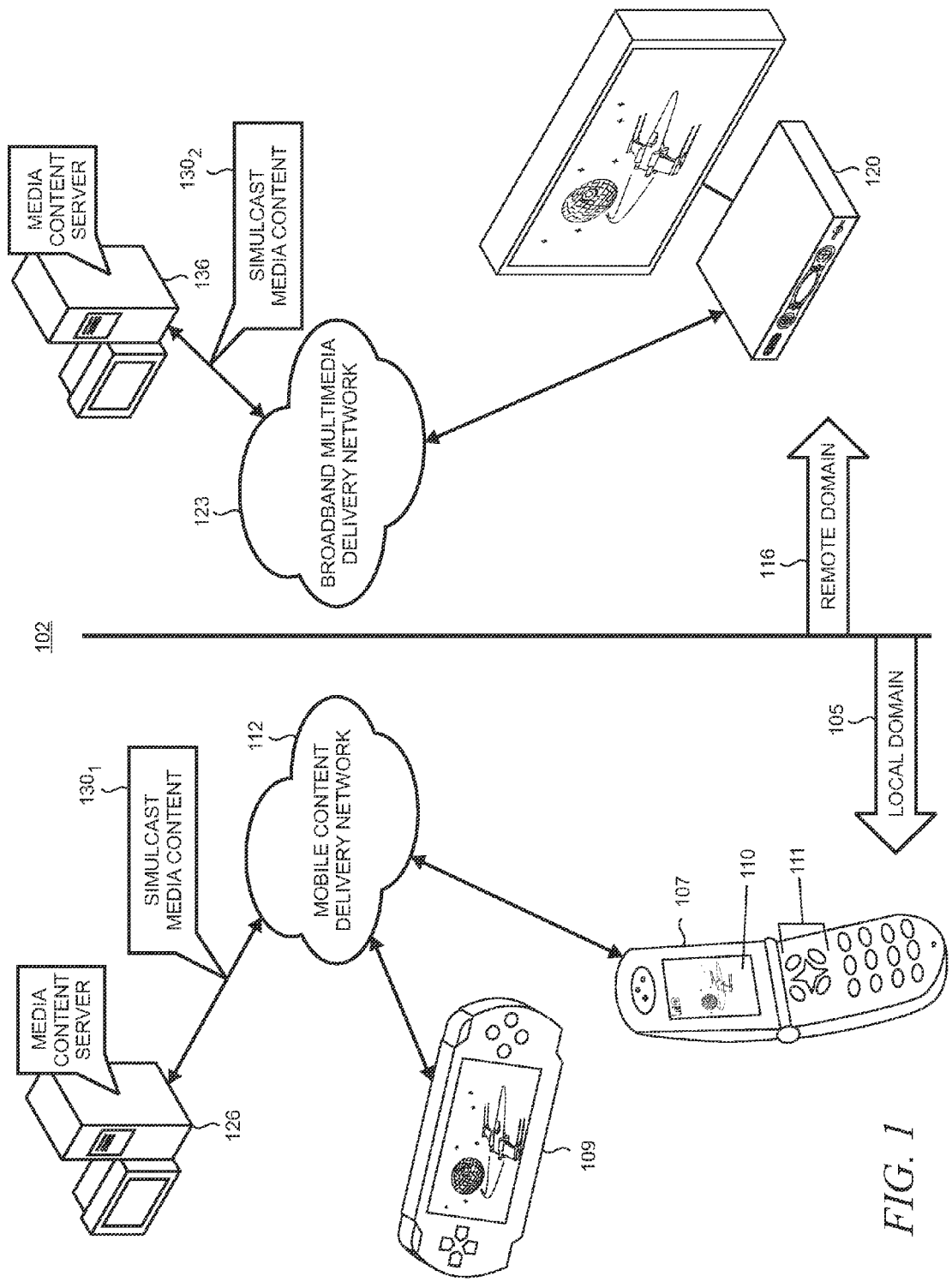
FIG. 1 shows an illustrative arrangement for remotely operating a recorder from a mobile device.

Turning now to FIG. 1, an illustrative arrangement 102 is shown which includes a local domain 105 in which mobile media rendering devices 107 and 109 operate with a mobile content delivery network 112, and a remote domain 116 in which an STB 120 operates with a broadband multimedia delivery network 123.

The mobile devices shown in FIG. 1 include a mobile phone 107 and a handheld game/media player 109. Mobile phone 107 and handheld game/media player 109 are representative of the variety of mobile devices that may be beneficially arranged to use the present remote recording control from a mobile device. Such devices typically have a presentation display or screen and a wireless network connection capability and include smart phones (i.e., computer-like phones), personal digital assistants, mobile phones, satellite phones, handheld game devices, portable media rendering devices that typically can play audio such as music and video, pocket PCs (personal computers), tablet PCs, laptop computers, notebook computers, webpads, and the like.

As shown in FIG. 1, mobile phone 107 includes a display screen 110. Display screen 110 is used to show video content as well as a GUI that enables a user to navigate along menus to operate the mobile phone's various features and functions typically by interacting with navigation controls 111 that include buttons and a cursor control key. In some applications of the present remote recording control from a mobile device, mobile phone 107 is configured with a memory (not shown) for storing data including pictures, messages, and other media. In some cases, the memory is built into the mobile phone 107, in other cases the memory is removable and implemented using solid state memory such as SD (Secure Digital) and CF (CompactFlash cards), or memory sticks.

Mobile phone 107 and handheld game and media player 109 are coupled to a media content server 126 via the mobile content delivery network 112. Media content server 126 is typically operated by a mobile content provider and provides mobile content including a simulcast media content $130_1$. As noted above, simulcast media content is media content that is simultaneously available, typically via broadcast or on-demand, over two or more different delivery systems. Mobile content delivery network 112 is arranged as a wireless network using one or more of the wireless communication protocols that support streaming video including, for example, third generation ("3G") wireless networks such as EV-DO (Evolution Data Optimized), HSDPA (High-Speed Downlink Packet access), WiMax (Worldwide Interoperability for Microwave Access), and Wi-Fi (a wireless local area network protocol described by the Wi-Fi Alliance).

Broadband multimedia network 123 is typically operated by a service provider such as a multiple system operator ("MSO"). Broadband multimedia network 123 uses physical infrastructure such as HFC (hybrid-fiber coaxial cable) networks, optical fiber networks, or telephone networks or is alternatively implemented using a satellite network infrastructure such as DBS (direct broadcast satellite). STB 120 is coupled to a media content server 136 via the broadband multimedia network 123 to receive simulcast media content $130_2$. In some applications, media content server 136 is incorporated into a controller disposed at a headend disposed on the network 123. Broadband multimedia network 123 is commonly configured to support multiple networks on a common physical infrastructure including an in-band content delivery network, an out-of-band ("OOB") messaging network, and a broadband IP-managed (internet protocol) data network using the CableLabs DOCSIS standard (Data over Cable Interface Specification).

In some applications of the present remote recording control from a mobile device, both networks 112 and 123 are operated by the same service provider. However, in many applications the networks are shared on a contractual business basis to thus enable collaborative service offerings. For example, a media content owner/creator (e.g., a movie studio or premium cable channel production company) may team up with a mobile phone network operator to provide simulcast television or movie programming over both mobile phone and cable television networks. As mobile and fixed-terminal services continue to converge, such collaborative offerings are expected to increase to the point where a substantial catalog of programming will be available for simultaneous consumption on portable devices and conventional televisions.

Simulcast media content $130_1$ and $130_2$, while representing the same creative content (e.g., the same television program, sports event, etc.) are typically formatted differently and carried over their respective networks using different transport protocols. In this illustrative example, simulcast media content $130_1$ is formatted as an MPEG-4 (Moving Pictures Expert Group 4) bitstream that is compliant with DVB-H (under European Telecommunications Standards Institute, ETSI EN 302 304) with a QCIF (Quarter Common Intermediate Format) resolution of 176×144 pixels. By comparison, simulcast media content $130_2$ is typically formatted as a MPEG-2 compliant DTV (Digital Television) signal under the Advanced Television Systems Committee, ATSC A/53 standard. DTV signals are typically encoded in the SDTV (standard definition television) resolution of 720×480 pixels and may also include HDTV (high definition television) resolutions of 1920×1080 pixels in either interlaced or progressive formats.

Figure 2:
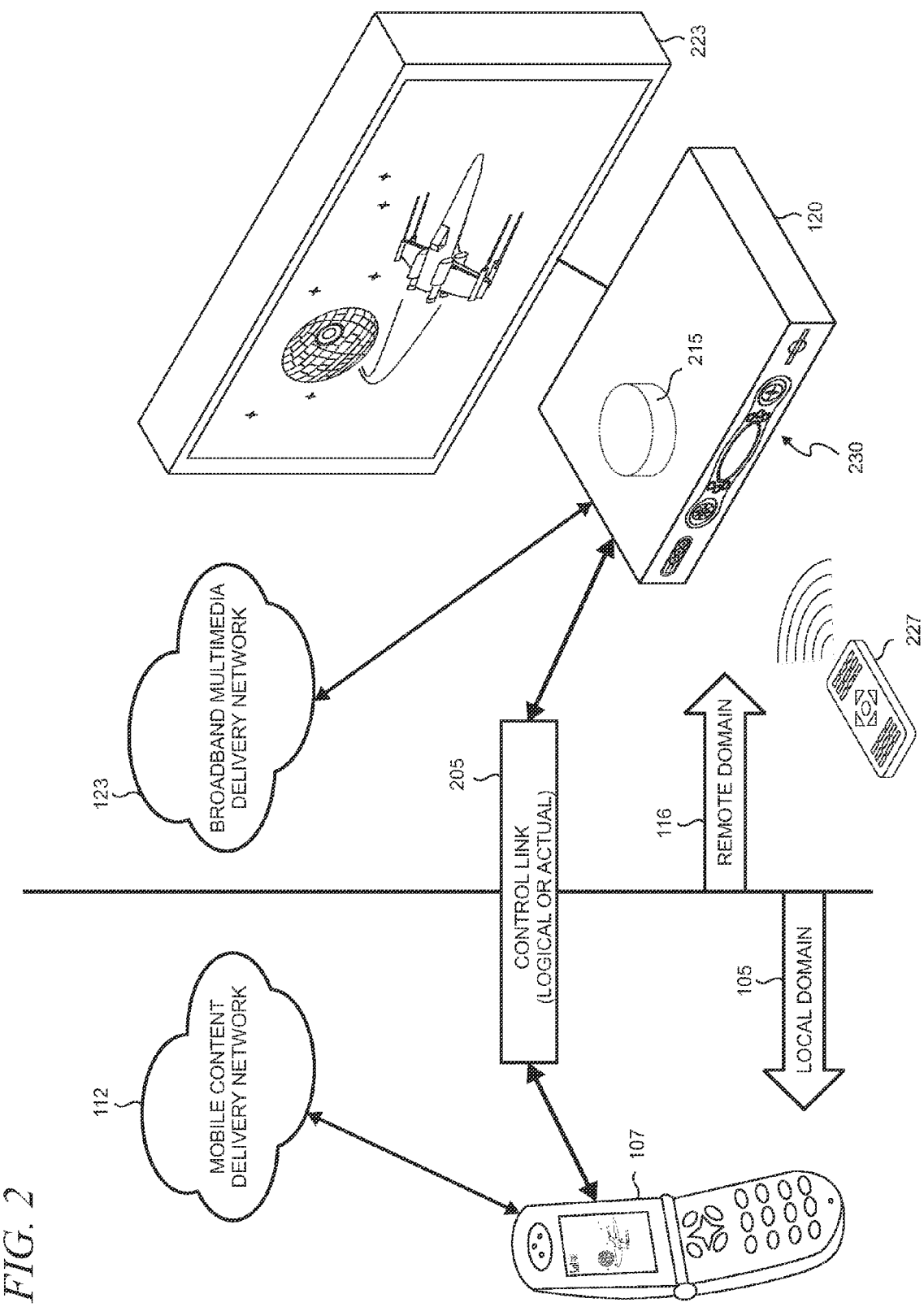
FIG. 2 shows an illustrative control link that is established between a mobile device and a remote digital video recorder disposed in a set top box.

FIG. 2 shows an illustrative control link 205 that is established between a mobile device and a remote digital video recorder ("DVR") 215 disposed in the STB 120 which is shown in an enlarged view to show additional details. STB 120 is arranged to tune to selected simulcast media content that is multiplexed into the broadband signal from media content server 136. A user typically interacts with a graphical electronic program guide ("EPG") provided by an application, middleware, or firmware resident on the STB 120 that is displayed on a television 223 to browse available content and make choices using a remote control 227 or front panel controls 230 on STB 120. DVRs are typically configured with a variety of useful features that are typically enabled with menus on the EPG such as "all episode" or "season pass" recording. This allows a user to set the DVR to automatically record each episode of a serial program as they are broadcast (i.e., on a recurring basis). DVRs with networking capability are also becoming more common. Such DVRs enable stored media content to be shared over a home network with multiple STBs and televisions in various locations in the home using a multi-room or whole-home DVR service.

DVRs commonly enable recording to be performed on a temporary or more permanent basis (called a persistent basis). Temporary recordings are often created by buffering the media program being input into a solid state memory or an allocated portion of the hard disk in the DVR to allow live television to be paused and resumed. The temporary buffer is emptied and refilled with each program change. Generally, the temporary buffer is limited to between 30 minutes and an hour or two of programming content. However, the buffered live TV recording is not a permanent recording unless it is actually recorded to the DVR's hard disk memory (and thus becomes a persistent recording). Typically, both temporary and persistent recordings are stored on hard disk and a temporary recording becomes a persistent recording if at anytime during the recording process the user selects a "record" function. In the present arrangement, a temporary recording is usable to become the start of a persistent recording, or the temporary recording is pre-pended to a new persistent recording.

Persistent recordings also take advantage of a common DVR feature in which DVR users may designate recording options that determine how long a particular recorded media program will be stored on the DVR's hard disk. Such options typically include: 1) storing the recorded program until hard disk space is needed; and 2) storing the recorded program until the user affirmatively deletes it. With option 1, the DVR keeps the program in memory for a certain minimum time (e.g., several days) and only deletes the program to make room for new shows (e.g., new episodes of a serial program that is designated as a recurring recording). This option generally provides enough time for the user to watch the recorded show. However, depending on the size of the DVR's hard disk and the amount of programming recorded, it is possible for a user to miss watching the program before it is deleted. Option 2 ensures that the user will have the opportunity to watch the program, although it can leave the DVR with insufficient space to record other programs.

The control link 205 establishes a communication link between a mobile device (which is mobile phone 107 in this illustrative example) and the DVR 215 so that commands, operating state information, and other data may be exchanged. Control link 205 may be implemented as an actual link using, for example, a direct network connection between the devices. Alternatively, control link 205 is implemented as a logical construct in which networks 112 and 123 are both utilized with an intermediary, such as a server, performing transcoding of messages and data, for example, from one data container format and one transport protocol to another.

Figure 3:
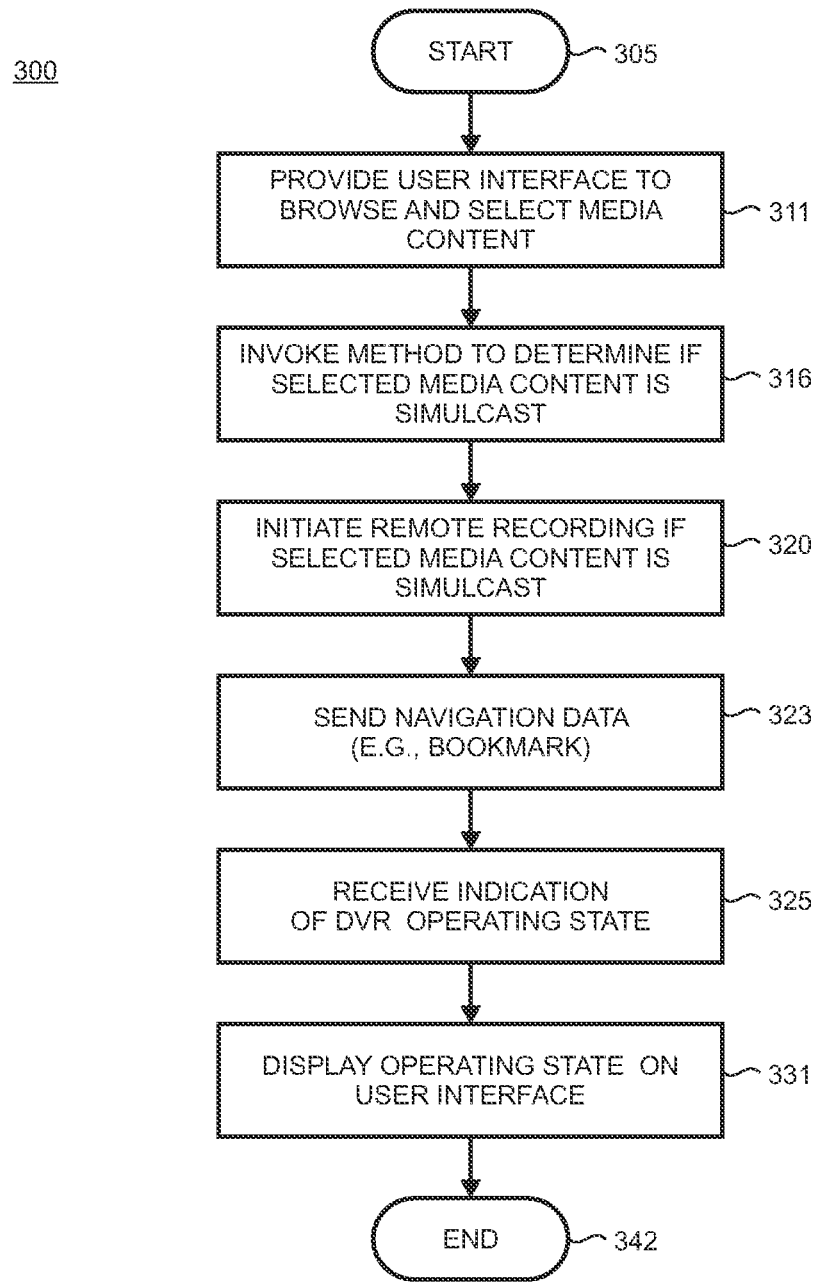
FIG. 3 is a flowchart of an illustrative method performed by a mobile device for remotely controlling a recorder and displaying the recorder's operating state on the mobile device.

FIG. 3 is a flowchart of an illustrative method 300 that is performed by a mobile device such as mobile phone 107 (FIGS. 1 and 2). Illustrative method 300 is implemented, in this example, by an application that runs on the mobile phone 107 generally in combination with functions provided by the mobile phone's operating system. Method 300 starts at block 305. At block 311, the mobile phone 107 displays on its video screen a user interface with which available mobile video content may be browsed and selected for viewing by a user. Generally, such user interface is provided with an ESG (electronic service guide) that is arranged with similar features and functions as an EPG to enable users to navigate mobile video content in both live and on-demand type formats.

At block 316, a method is invoked to determine if a particular user's selection of media programming is available as a simulcast program. Such invoked method may be performed locally on mobile phone 107 or at the ESG provider location, generally depending on the amount of ESG data that may be downloaded by the mobile phone 107.

If the selected media program is available for simulcast, or is being simulcast, then at block 320, recording of the simulcast program from media content server 136 (FIG. 1) is initiated. Such initiation may take the form of a command or message, for example, that is delivered over the control link 205 to the DVR 215 in STB 120 as shown in FIG. 2 which responsively records the selected simulcast media program. The initiation of recording is typically performed automatically by the mobile phone 107 whenever mobile media content is selected for consumption on the mobile phone 107 that is also available as simulcast media content that is recordable by the DVR 215. Accordingly, as the user switches from one media program to another on the mobile phone 107 to locate a program of interest (i.e., performs what is commonly known as "channel surfing"), remote recording initiation follows each program selection as a non-intrusive, or transparent background process. Such background process does not require any additional affirmative input from the user beyond the media program selection itself.

An alternative to the transparent background process is the provisioning of a user input (e.g., a virtual button displayed on display screen 110 on mobile phone 107) that allows the user to opt out of the automatic remote recording feature, or alternatively is required to be activated as an affirmative user input before remote recording is initiated. When arranged to use an affirmative input, the initiated remote recording has the same effect as if the recording were set directly at the DVR 215 and will be handled as a persistent recording.

In an illustrative example, a media program that is in the process of being persistently recorded on DVR 215 will not normally be terminated as a user channel surfs mobile content on the mobile phone 107. However, a media program may be remotely temporarily recorded by DVR 215 using the DVR's temporary buffer for example. As the user selects new mobile content on the mobile phone 107 (and assuming the new content is simulcast and thus available for recording on the remote DVR 215), the temporary buffer is emptied and the newly selected content is buffered. This process is reiterated as the user surfs available mobile content for as long as sufficient resources exist. For example, if DVR 215 is arranged with a single tuner, when the user changes from ABC, to NBC, to PBS at the mobile phone 107, the temporary recording at the remote DVR 215 is stopped, the buffer emptied and a new record buffer started each time the mobile content source is changed. In another example in which the DVR 215 is equipped with dual tuners, as the user changes from ABC to NBC, the second tuner may establish a second temporary buffer so that both the ABC and NBC programs are remotely temporarily recorded. However, when the user switches again from NBC to PBS, the least recent temporary recording (i.e., the ABC program) is terminated and the tuner and buffer resources are recycled for the next new user selection. This recycling process is performed continuously as new content is selected and consumed in both the single and dual tuner examples.

Continuing with the description of FIG. 3, navigation data, such as a bookmark, is optionally sent from the mobile phone 107 as shown at block 323. This feature enables a user to select "pause" on the mobile phone 107 to pause a media program, for example, when the user is about to get into a car. A "set bookmark" command is sent as navigation data over the control link 205 to the DVR 215 which indicates where in the media program the user stopped or paused watching. The DVR 215, by using the navigation data received over the control link 205, enables the user to resume watching the program from the DVR on television 223 (for example in HD) at the exact point where it was paused on the mobile phone 107. Similarly, a "Move Show" command is selectable by a user from mobile phone 107 and sent as navigation data over the control link 205 to DVR 215. Receipt of this command at DVR 215 results in any portion of the selected simulcast media program, that is being temporarily buffered by the DVR 215, to be recorded onto the DVR's hard disk as a persistent recording.

At block 325, the mobile phone 107 receives an indication of the DVR's operating state. In this illustrative example such operating states include: 1) successfully recording the selected program on a persistent basis; 2) successfully recording the selected program on a temporary basis; and 3) a problem with the recording exists. Icons representing the various DVR operating states are displayed, as appropriate, on the mobile phone's user interface as indicated at block 331. Illustrative method 300 ends at block 342.

Figure 4:
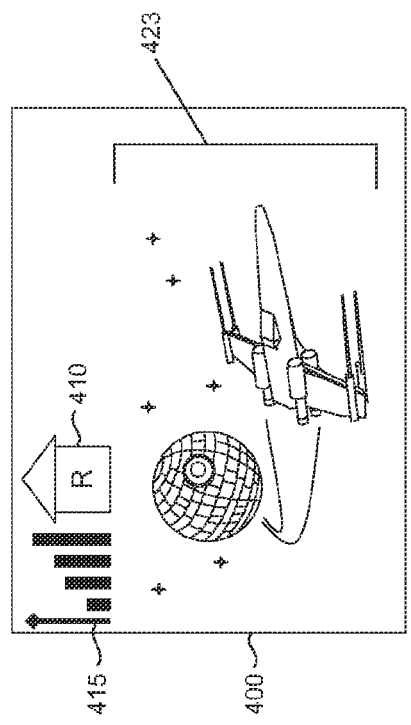
FIGS. 4-8 are illustrative screen shots of icons displayed on the display screen of a mobile device that are used to indicate various DVR operating states.

FIGS. 4-8 are illustrative screen shots of icons displayed on the display screen 110 of mobile phone 107 (FIG. 1) that are used to indicate various DVR operating states. FIG. 4 is an illustrative screen shot 400 of a graphical display on screen 110 showing an icon 410 that indicates that the state of remote DVR 215 is recording a simulcast media program. Icon 410 is shown next to the commonly used signal strength indicator 415. In this way, icon 410 is in a location that is readily scanned by a user, but is not intrusive and does not interfere with watching the video content 423 being rendered on the mobile phone's display screen 110.

In this illustrative example, an "R" is shown in a graphical element representing a house to indicate that the remote recording at home is successfully being performed on a persistent basis so that the recorded program is stored on a long term basis on the DVR. It is noted, however, that other icons and displays may be selected as a matter of design choice in response to the particular requirements of a specific application of the present remote recording control.

Illustrative icon 410 is contemplated for use in two scenarios. It is displayed to indicate that the media program selected by the user on the mobile phone 107 is being persistently recorded because it had already been selected by the user as a recurring recording on the DVR 215. Icon 410 is also displayed to indicate that the selected simulcast media program is being persistently recorded by DVR 215 responsively to a record command received over control link 205 (FIG. 2) that is generated via an affirmative virtual button push on mobile phone 107 as described above in the text accompany block 320 in FIG. 3.

Figure 5:
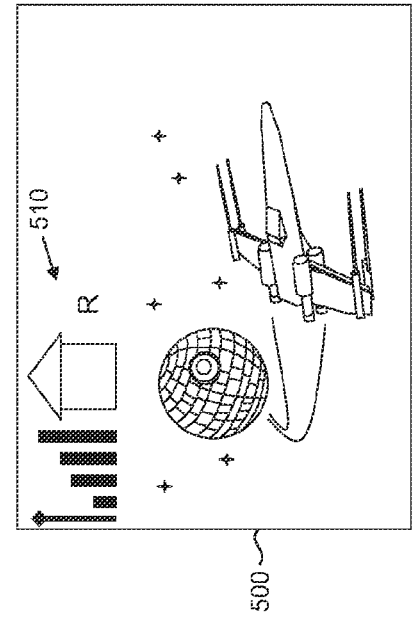

FIG. 5 is an illustrative screen shot 500 of a graphical display on screen 110 (FIG. 1) showing an icon 510 that indicates that the selected simulcast media program is being locally recorded on mobile phone 107 when it is configured with the capability to store received mobile content such as video programming to memory. Here, the "R" in the circle is moved outside the graphical house element to indicate that the recording of the selected simulcast media program is being performed outside the home and not by DVR 215 (FIG. 2).

Figure 6:
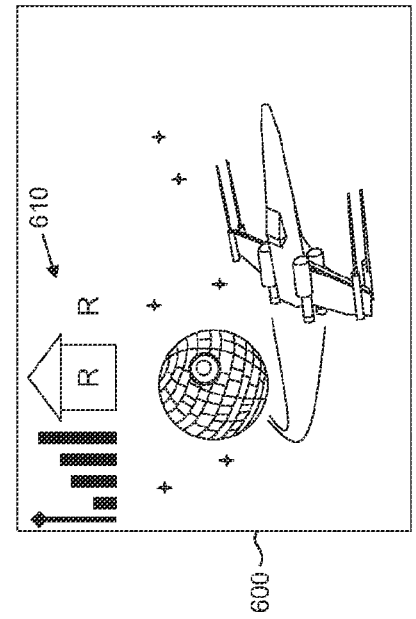

FIG. 6 is an illustrative screen shot 600 of a graphical display on screen 110 (FIG. 1) showing an icon 610 that indicates that the selected simulcast media program is being locally recorded on mobile phone 107 as well as by the remote DVR 215. Here, the "R" in the circle is placed both outside and inside the graphical house element to indicate that the recording of the selected simulcast media program is being performed both inside and outside the home.

Figure 7:
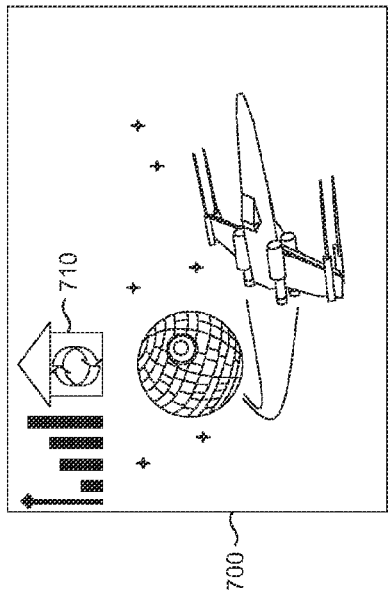

FIG. 7 is an illustrative screen shot 700 of a graphical display on screen 110 (FIG. 1) showing an icon 710 that indicates that the state of remote DVR 215 (FIG. 2) is performing a temporary recording of the media program selected by the user using the DVR's temporary buffer. As noted above, the buffer is typically continuously recycled. Accordingly, icon 710 is arranged with circular arrow elements to indicate the operating state of the remote DVR 215 is performing a temporary recording.

Figure 8:
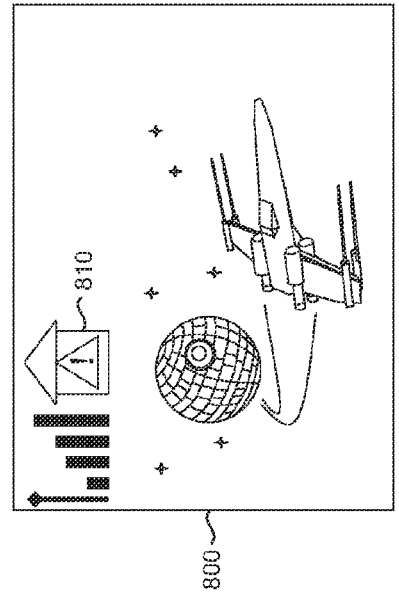

FIG. 8 is an illustrative screen shot 800 of a graphical display on mobile phone 107 (FIG. 1) showing an icon 810 that indicates that the remote DVR 215 (FIG. 2) is experiencing a problem in recording and that user attention is required. This situation might occur if the DVR 215 has run out of disk storage space, or the STB 120 does not have an available tuner to tune to the selected simulcast media program (which could occur if the STB/DVR combo is a single tuner model and someone at home is already tuned to a program other than the selected simulcast media program). Other possible causes of problems include, for example, lack of permissions in systems where parental or other types of controls are used, or the simulcast media content is being transmitted on a service to which the user does not subscribe.

Figure 9:
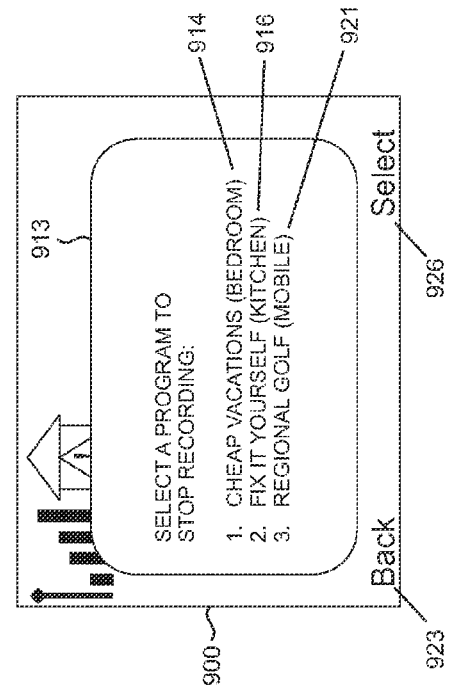
FIG. 9 is an illustrative screen shot of a graphical display on the display screen of a mobile device showing a menu that enables a user to select a simulcast media program for which recording will be terminated.

FIG. 9 is an illustrative screen shot 900 of a graphical display on mobile phone 107 (FIG. 1) showing a menu 913 that enables a user to select a simulcast media program for which recording will be terminated as may be required to solve the recording conflict. Menu 913 is arrangeable to show the location, or user watching or recording the event that is causing the conflict. Menu 913 is generated in part using operating state data from DVR 215 that is sent over control link 205 (FIG. 2) to mobile phone 107. For example, as shown in FIG. 9, two simulcast media programs are being recorded on DVR 215 which, in this illustrative example, is configured as a dual-tuner DVR. Recording of the first program 914 was initiated by a user in the bedroom and recording of the second program 916 was initiated by a user in the kitchen. A third program 921 is being locally recorded on mobile phone 107. When the user selects an additional simulcast media program to record a conflict arises because all available recording resources are being utilized (i.e., both tuners on DVR 215 and the video storage function on mobile phone 107). Accordingly, to resolve that conflict, the user is provided with the option to pick a simulcast media program recording for termination to free up the required resources to record the new selected program. Common navigation buttons 923 and 926 are also shown in screen shot 900.

Figure 10:
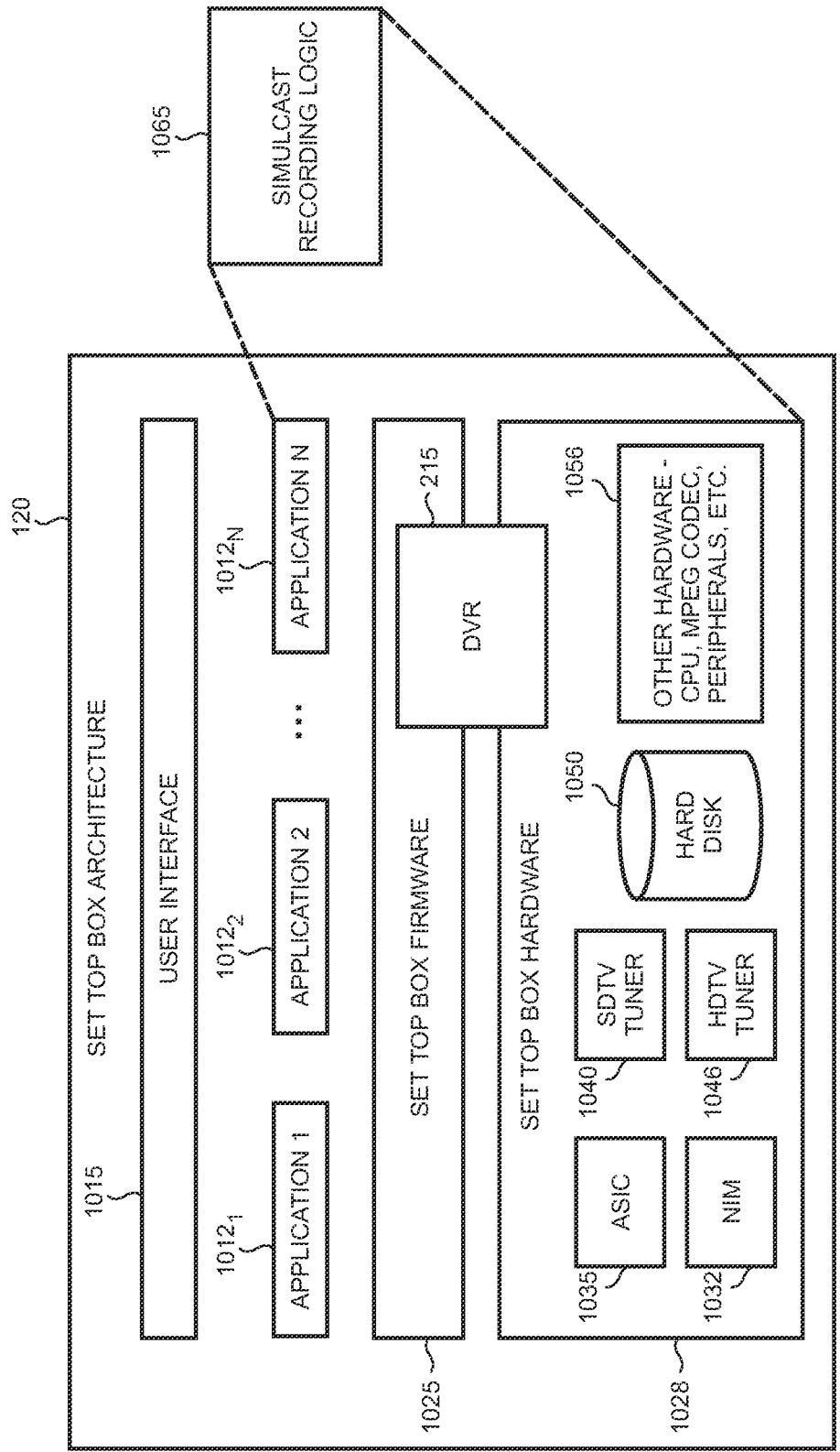
FIG. 10 is a simplified block diagram of an architecture for an illustrative STB.

FIG. 10 is a simplified block diagram of an architecture for the illustrative STB 120 shown in FIGS. 1 and 2. STB 120, in this illustrative example, includes a group of applications $1012_{1-N}$ which is a common configuration, however, STB 120 may be arranged to include just a single application. Applications 1012 provide a variety of common STB functionalities including, for example, EPG functions, web browsing, email, support for electronic commerce and the like.

A user interface 1015 is provided in STB 120 to display prompts and receive user input, typically using EPG-type menus displayed on television 223 (FIG. 2). User interface 1015 may be implemented using a software application or is alternatively implemented using an application programming interface ("API") that is commonly accessed by applications.

STB firmware 1025 is resident in STB 120 in a layer between the applications 1012 and STB hardware 1028 which functions as an intermediary between these architecture layers and also typically performs lower level functions for the STB 120 including, for example, functions that support the applications 1012. Below the firmware 1025 is a layer of STB hardware 1028. Hardware 1028 includes a network interface or adapter function provided by NIM (network interface module) 1032 and one or more application specific integrated circuits ("ASIC"), collectively represented by reference numeral 1035. An SDTV tuner 1040 and an HDTV tuner 1046 are provided in a dual-tuner configuration. NIM 1032 is utilized in this illustrative example to receive media content and control signals forming the logical control link 205 (FIG. 2) from the media content server 136.

A hard disk 1050 is provided to store media content recorded by the DVR 215. DVR 215, in this illustrative example, is embedded in STB 120 and is substantially implemented in a combination of hardware and firmware (e.g., hardware 1028 and firmware 1025) in most applications of the present remote recording control from a mobile device.

Other hardware 1056 including, for example, interfaces, peripherals, ports, a CPU (central processing unit), MPEG codec, memory, and various other components are also commonly utilized to provide conventional STB features and functions.

Simulcast recording logic 1065 is a logical component of STB 120 that may be discretely physically embodied in some applications in either hardware 1028 (e.g., using ASIC 1035), firmware 1025, or software (e.g., applications 1012), or a combination thereof. Simulcast recording logic 1065 is arranged to manage recordings of simulcast programming responsively to commands received over control link 205 (FIG. 2).

Figure 11:
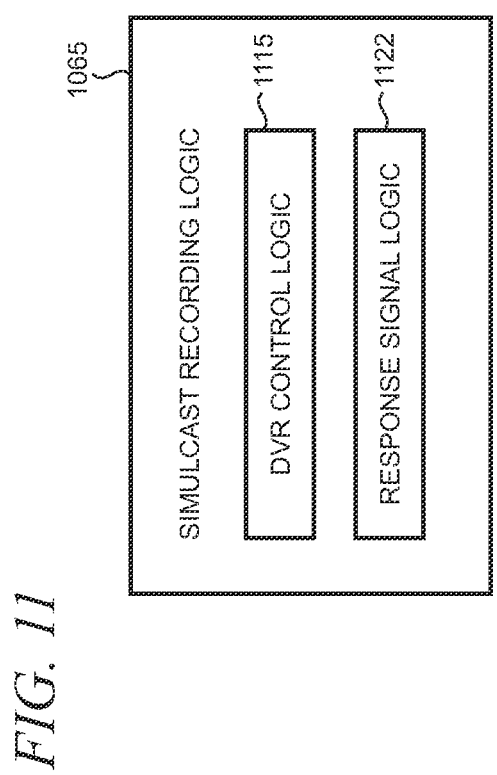
FIG. 11 is a simplified block diagram of an illustrative simulcast recording logic that is resident on the STB shown in FIGS. 1-3.

As shown in FIG. 11, simulcast recording logic 1065 includes DVR control logic 1115 and response signal logic 1122. DVR control logic 1115 is arranged to implement the remote DVR recording operations that are responsive to the commands received over control link 205 (FIG. 5) from mobile phone 107 (FIG. 1) as described in the text accompanying FIG. 3. Response signal logic 1122 is arranged to generate signals indicative of the DVR's operational state that are sent to the mobile phone 107 and used to generate the icons shown in FIGS. 4-9.

Figure 12:
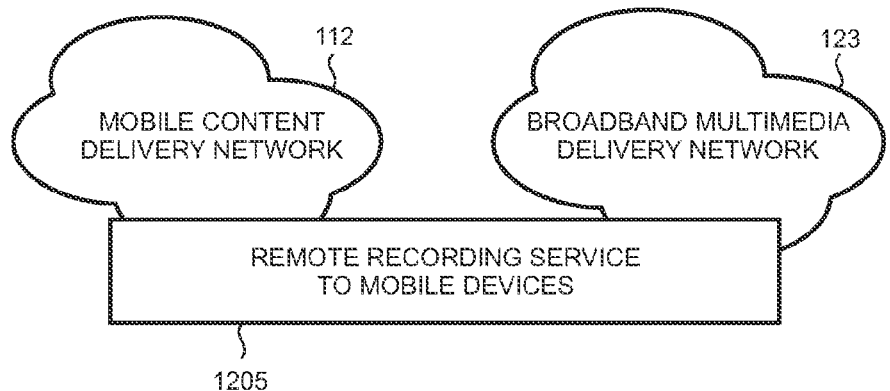
FIG. 12 is a simplified block diagram showing a service that bridges two delivery networks for providing remote recording to a mobile device.

FIG. 12 is a simplified block diagram showing a service 1205 that bridges the mobile content delivery network 112 and broadband multimedia delivery network 123 for providing remote recording capabilities to a mobile device such as mobile phone 107 (FIG. 1). Networks 112 and 123 are also shown in FIG. 1 and described in the accompanying text. Service 1205 provides the necessary hand off between the control and data signals sent over the logical control link 205 (FIG. 2) that is implemented using networks 112 and 123 which are technically-disparate since they do not share common infrastructure or protocols. Service 1205 generally utilizes one or more servers that function as intermediaries to broker communications between the mobile phone 107 and STB 215 shown in FIG. 2.

Figure 13:
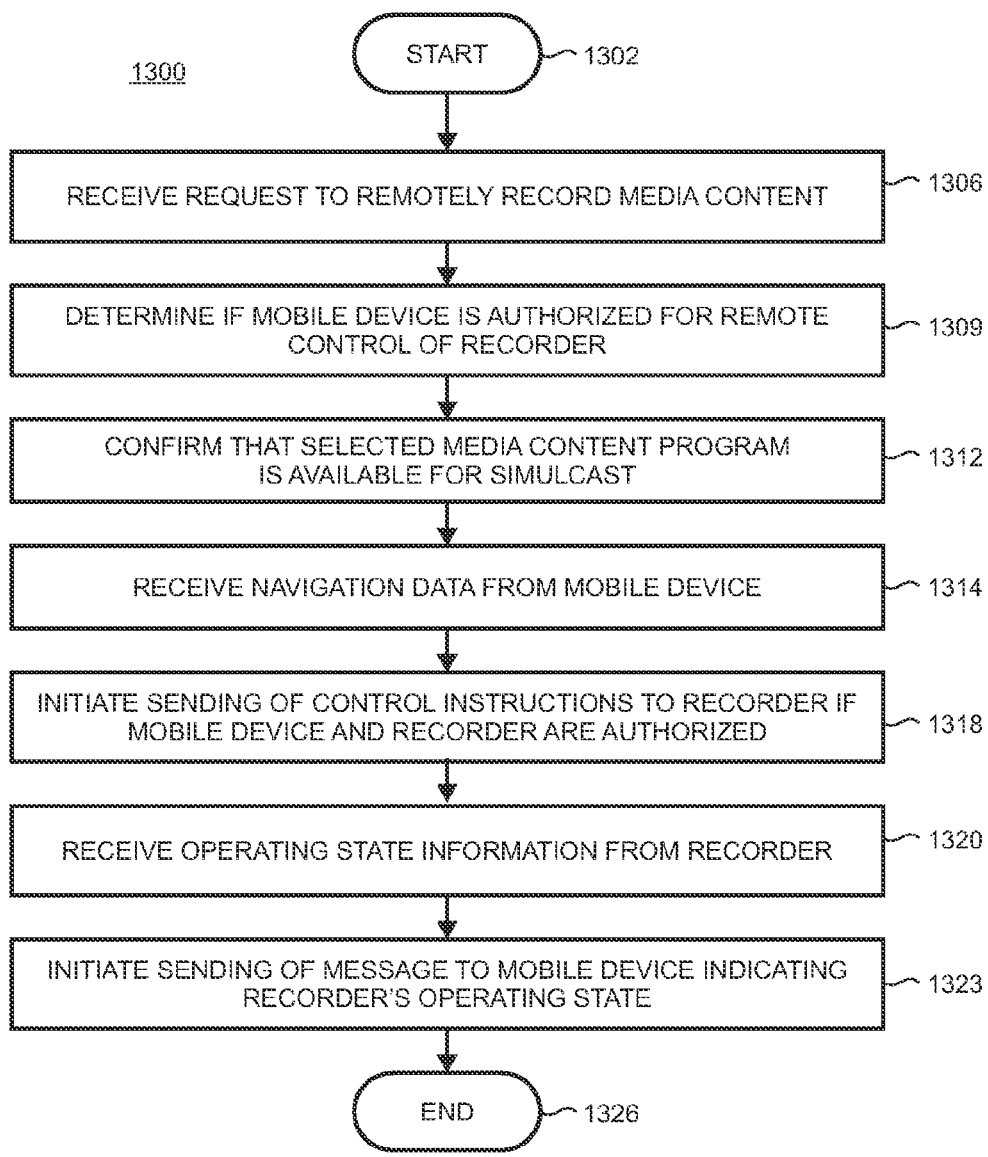
FIG. 13 is a flowchart of an illustrative method that may be performed by the service shown in FIG. 12.

FIG. 13 is a flowchart of an illustrative method 1300 that may be performed by the service 1205 shown in FIG. 12. The illustrative method 1300 starts at block 1302. At block 1306, service 1205 receives a request from a mobile device (e.g., mobile phone 107 in FIG. 2) to remotely record media content on a recorder (e.g., DVR 215 in FIG. 2). Service 1205 determines if the mobile device is authorized to initiate and control a remote recorder at block 1309. This may include, for example, checking with a business system, such as one implemented on a database server, to confirm that a user associated with the mobile device and remote recorder hold a valid subscription to the service 1205.

Block 1312 indicates that the selected media content program contained in the request from the mobile device is verified as being one that is simulcast to the remote recorder. In one illustrative implementation this is verified by accessing EPG-type data from each of the mobile content network (e.g., network 112 in FIG. 1) and the broadband multimedia delivery network (e.g., network 123 in FIG. 1). In another illustrative implementation, data embedded in the mobile content stream, such as metadata, may be checked for a content or program identifier which can be mapped against EPG data from the broadband multimedia delivery network.

Block 1314 shows an optional step in method 1300 in which navigation data (such as a bookmark, a pause command, a set bookmark command, move show command, or stop command) is received by the service 1205. This is optional because the mobile device does not necessarily need to send navigation data in order to use the present remote recording arrangement.

If the mobile device and remote recorder are determined as being associated with a valid service subscription and thus authorized devices, then the service 1205, as indicated by block 1318, initiates the creation of control instructions that are responsive to the request received at block 1306. The control instructions are relayed to the appropriate communication systems on the broadband multimedia delivery network 123 (FIG. 1) to be thereby delivered to the recorder.

At block 1320, the service 1205 receives operational state information from the recorder. As noted above in the text accompanying FIG. 3 such operational states include, for example, 1) successfully recording the selected program on a persistent basis; 2) successfully recording the selected program on a temporary basis; and 3) a problem with the recording exists.

At block 1323, the service 1205 initiates the creation of a message that is relayed to the appropriate communication systems in mobile content delivery network 112 (FIG. 1) to be thereby delivered to the mobile device. The message is indicative of the recorder's operational state which is used by the mobile device to display a corresponding icon such as the ones shown in FIGS. 4-8 and described in the accompanying text.

The simulcast media program noted in the foregoing description is alternatively embodied using one of a plurality of resolutions, the resolutions being selected from one of SQCIF (Subquarter Common Intermediate Format), QCIF (Quarter Common Intermediate Format), CIF (Common Intermediate Format), or HDTV (High Definition Television). In addition the simulcast media program is alternatively delivered using one of a plurality of distribution protocols, the distribution protocols being selected from one of DVB-S (Digital Video Broadcasting-Satellite), DVB-S2 (Digital Video Broadcasting-Satellite, Second Generation), DVB-T (Digital Video Broadcasting-Terrestrial), DVB-H (Digital Video Broadcasting-Handheld), DVB-C (Digital Video Broadcasting-Cable), DVB-MT (Digital Video Broadcasting-Microwave using Digital Terrestrial Television), DVB-MC (Digital Video Broadcasting-Microwave using Multichannel Multipoint Distribution System) or DVB-MS Digital Video Broadcasting-Microwave using Multipoint Video Distribution System).

Each of the processes shown in the figures and described above may be implemented in a general, multi-purpose or single purpose processor. Such a processor will execute instructions, either at the assembly, compiled, or machine-level, to perform that process. Those instructions can be written by one of ordinary skill in the art following the description contained herein and stored or transmitted on a computer readable medium. The instructions may also be created using source code or any other known computer-aided design tool. A computer readable medium may be any medium capable of carrying those instructions and includes a CD-ROM (compact disc read-only memory), DVD (digital versatile disc), magnetic or other optical disc, tape, silicon memory (e.g., removable, non-removable, volatile or non-volatile), packetized or non-packetized wireline or wireless transmission signals.

What is claimed is:

1. A non-transitory computer-readable medium containing instructions which, when executed by one or more processors disposed in a media content rendering device, performs a method comprising:

providing a user interface of the media rendering device for user selection of a media content program;

invoking a method for determining if the selected media content program is simultaneously receivable at the media content rendering device in a first format via a first network and a remotely located recorder in a second format that is different from the first format via a second network that is different from the first network;

displaying an alert on the user interface, the alert indicating an operational state of the remotely located recorder, wherein the alert is based on an indication received from the remotely located recorder; and sending a signal to initiate the remotely located recorder to record at least a portion of the selected media content program upon determining that the selected media content program is simultaneously receivable at the media content rendering device in the first format and the remotely located recorder in the second format.

2. The non-transitory computer-readable medium of claim 1 in which the method further includes invoking a method for recording the media content program to an internal recording device disposed in the media content rendering device.

3. The non-transitory computer-readable medium of claim 1 in which the media content rendering device is one of mobile phone, smart phone, personal digital assistant, pocket PC, handheld gaming device, music player, video player, MP3 player, personal computer, laptop computer, webpad, or tablet PC.

4. The non-transitory computer-readable medium of claim 1 in which the media content program is selected from one of television program, live broadcast program, movie, sports event, news, radio programming, or streaming multimedia.

5. The non-transitory computer-readable medium of claim 1 in which the operational state includes one of persistently recording the selected media program, recording the selected media program on temporary storage basis, or inability to record the selected program.

6. The non-transitory computer-readable medium of claim 1 in which the invoked method is performed by a remote system, the remote system being selected from one of server or computer-implemented service.

7. The non-transitory computer-readable medium of claim 1 in which the user interface is integrated into a graphical user interface that is shared among a plurality of functionalities provided by the media content rendering device, the functionalities selected from one of mobile telephone functions, messaging functions, game-playing functions or remote control functions.

8. The non-transitory computer-readable medium of claim 1 in which the invoking or sending is performed as transparent background processes which are automatically launched when the user performs the selection of the media program.

9. The non-transitory computer-readable medium of claim 1 in which the user interface is arranged for providing media program presentation controls, the presentation controls being selected from one of pausing or stopping.

10. The non-transitory computer-readable medium of claim 1 in which the user interface is arranged for providing media program selection controls to enable a user to scan a plurality of programming channels.

* * * * *